Nov. 29, 1966    J. N. DODGEN ETAL    3,288,051
APPARATUS FOR PRODUCING PELLETS FOR LIVESTOCK FEED
Filed May 27, 1963    5 Sheets-Sheet 2

INVENTORS
JOHN N. DODGEN
MERTON D. SNAPP
KENNETH R. JOHNSON
BY
Dick, Zarley + Henderson
ATTORNEYS Nov. 29, 1966     J. N. DODGEN ETAL     3,288,051
APPARATUS FOR PRODUCING PELLETS FOR LIVESTOCK FEED
Filed May 27, 1963                      5 Sheets-Sheet 3
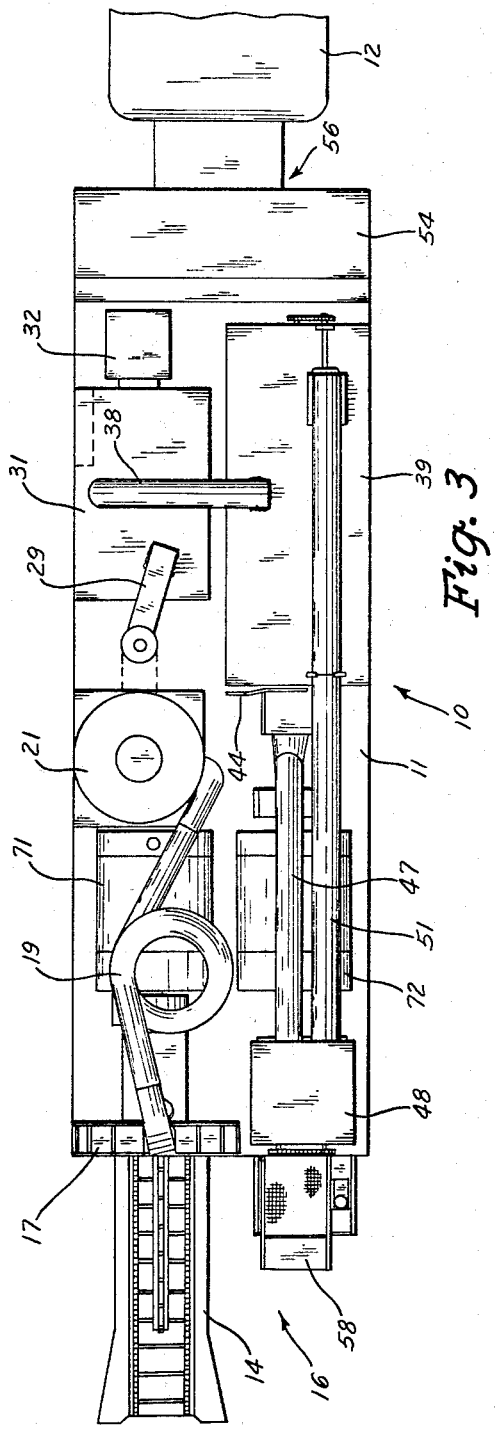
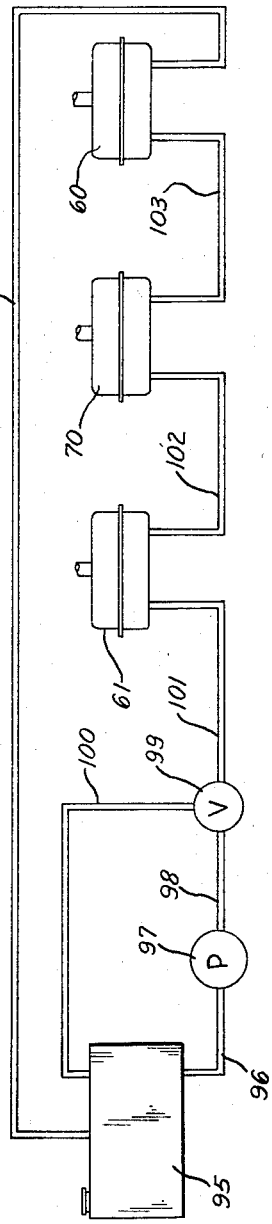
INVENTORS
JOHN N. DODGEN
MERTON D. SNAPP
KENNETH R. JOHNSON
BY Dick, Zarley & Henderson
ATTORNEYS

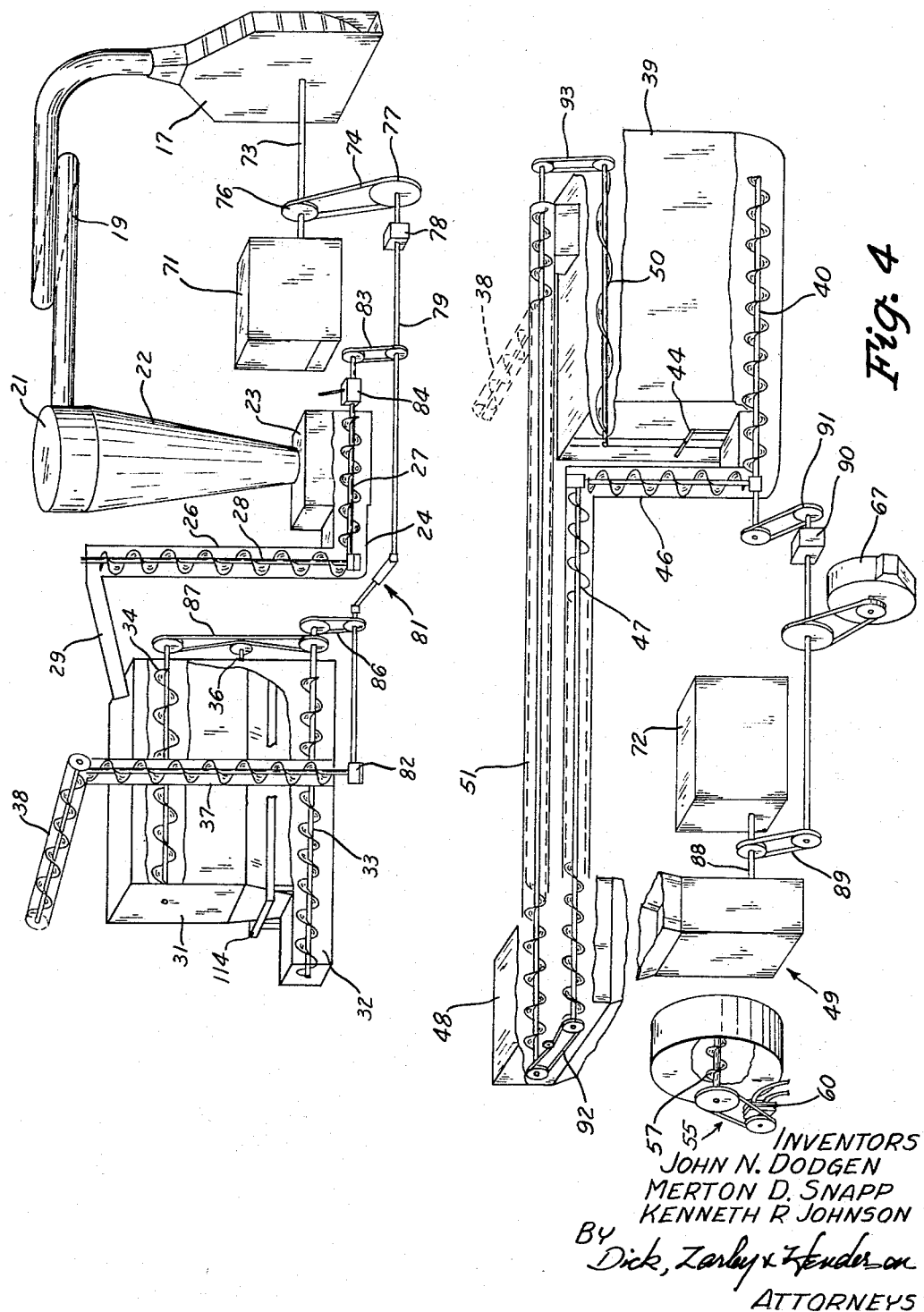

Nov. 29, 1966  J. N. DODGEN ETAL  3,288,051
APPARATUS FOR PRODUCING PELLETS FOR LIVESTOCK FEED
Filed May 27, 1963  5 Sheets-Sheet 5

INVENTORS
JOHN N. DODGEN
MERTON D. SNAPP
KENNETH R. JOHNSON
BY Dick, Zarley & Henderson
ATTORNEYS

United States Patent Office 3,288,051
Patented Nov. 29, 1966

3,288,051
APPARATUS FOR PRODUCING PELLETS FOR LIVESTOCK FEED
John N. Dodgen, Merton D. Snapp, and Kenneth R. Johnson, Humboldt, Iowa, assignors to Dodgen Industries, Inc., Humboldt, Iowa, a corporation of Iowa
Filed May 27, 1963, Ser. No. 283,306
13 Claims. (Cl. 99—235)

This invention refers generally to the pelleting of hay or the like, and particularly to an improved apparatus for producing pellets from hay for feeding livestock.

The question of the form in which a hay crop should be harvested and fed to livestock has been receiving considerable attention in recent years. It has been found, for example, that pelleted, finely-ground hay results in increased feed intake by livestock due to faster passage of hay through the digestive tract. It was also found that the hay is presented in an improved package—so to speak—in that reduced storage space was needed, feeding was easier, reduced waste of hay in refusals by livestock resulted, and transportation costs were reduced.

One main problem which presented itself was the provision of a complete pelleting process, and the provision of a complete machine for pelleting the hay which could be easily transported directly to the farmer or rancher, thus effecting even greater savings in reducing transportation costs.

It is, therefore, an object of this invention to provide an improved machine for pelleting hay and the like for use primarily as livestock feed.

It is another object of this invention to provide a single feed processing mechanism which will grind, measure, mix, and deliver a constant volume of feed, and supplement if desired, for the production of pellets, and which mechanism will additionally screen and otherwise inspect the discharged pellets, returning unsatisfactory pellets for re-processing; thus ensuring a final discharge of only satisfactory pellets.

Still another object of this invention is the provision of a feed processing machine capable of accepting baled hay and discharging pellets in one continuous operation, which machine is readily portable for use on the farm and on the ranch at the operator's convenience.

Yet another object of this invention is the provision of a conveyor assembly for conveying a mixture of finely ground hay and feed supplement to the hopper of a pellet making assembly in a continuous manner requiring no attendance or supervision by the operator.

Another object of this invention is the provision of a unit for forcing mixed feed into a pellet making unit, as compared to depending upon gravity.

It is another object of this invention to provide a pellet making machine embodying a single feed processing mechanism wherein all the operating parts are capable of being operated by but one or two sources of power.

Yet another object of this invention is the provision of a pelleting machine capable of attaining all the above designated objectives which is economical of manufacture, easily serviced, and effective in operation.

These objects, and other features and advantages of this invention will become readily apparent upon reference to the following description when taken into consideration with the accompanying drawings, wherein:

FIG. 3 is a plan view of FIG. 2;

FIG. 4 is a two part, schematic view showing primarily the path of the feed as it is processed through substantially the entire machine;

FIG. 8 is a schematic of the hydraulic circuit for the pellet shaker system.

Figure 1:
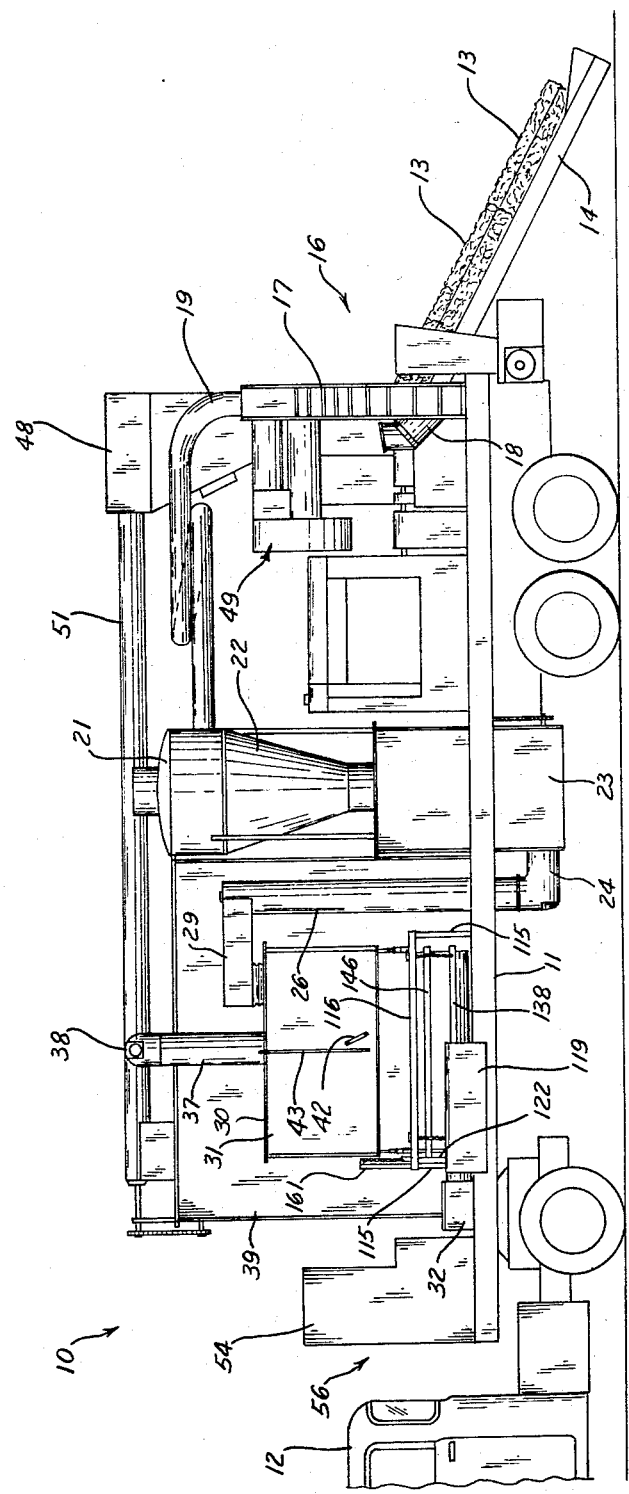
FIG. 1 is a side elevational view of a preferred embodiment of this invention.

Referring now to the drawings, the feed processing machine of this invention is indicated generally by the numeral 10, and comprises feed processing apparatus operatively mounted on the trailer section 11 of a semi-trailer type vehicle having a cab section 12 to which the trailer section 11 is connected. Dolly wheels, although not shown, are provided for supporting the forward end of the trailer section 11 when uncoupled from the cab section. Although a semi-trailer type vehicle is depicted, it will be apparent that the apparatus hereinafter described could be mounted on the bed frame of any conventional wheeled vehicle of a truck size.

The apparatus directly related to processing bales 13 (FIG. 1) of hay includes a ground engageable, mechanical conveyor chute 14, which is pivotally connected to the rear 16 of the trailer section 11 for discharging the bales into a conventional hammer mill 17 mounted on the rear of the section 11. An inlet spout 18 (FIG. 1) is secured to the hammer mill 17 for introducing grain or the like into the mill in place of or in combination with the hay.

The usual blower (not shown) within the hammer mill 17 is operable to force the hay, grain or the like, finely ground for passage preferably through a one-eighth to three-eighths inch screen, through a horizontally-spiralled conduit 19 to the top 21 of a dust remover chamber 22. The lower end 23 (FIG. 4) of the chamber 22 functions as a collector of the ground material, hereinafter referred to as "feed."

From the feed collector 23 (FIG. 1), a pair of conduits 24 and 26 are provided for serving to transmit the feed by virtue of auger conveyors 27 and 28, respectively, mounted therein to an inlet conduit 29 leading to the top of a mixing bin 31 (FIGS. 1, 3 and 4). With respect to the auger conveyor 27, it will be noted by referring to FIG. 4 that it extends horizontally across substantially the entire feed collector 23.

The mixing bin 31 (FIG. 1) includes a closed top housing 30 which is supported upon a framework 114 by a supporting mechanism 123a.

The following description of the supporting mechanism 123a and the apparatus for weighing the feed within the mixing bin 31 are believed sufficient for the present invention. However, for a more detailed description, see Patent No. 3,065,808 issued November 27, 1962 to John N. Dodgen.

The framework 114 is comprised primarily of a quartet of uprights 115 forming a rectangle and interconnected by a quartet of connecting members 116 and 117. With respect to the supporting mechanism 123a, which is arranged to support the mixing bin 31 directly, or through a scale mechanism 119 for weighing the feed within the mixing bin 31, it includes primarily a quartet of legs 137 secured to and depending from the corners of the bin 31 and positioned within the confines of the supporting framework 114. The legs 137 are interconnected at their lower ends by horizontal side members 138 and 139.

Figure 7:
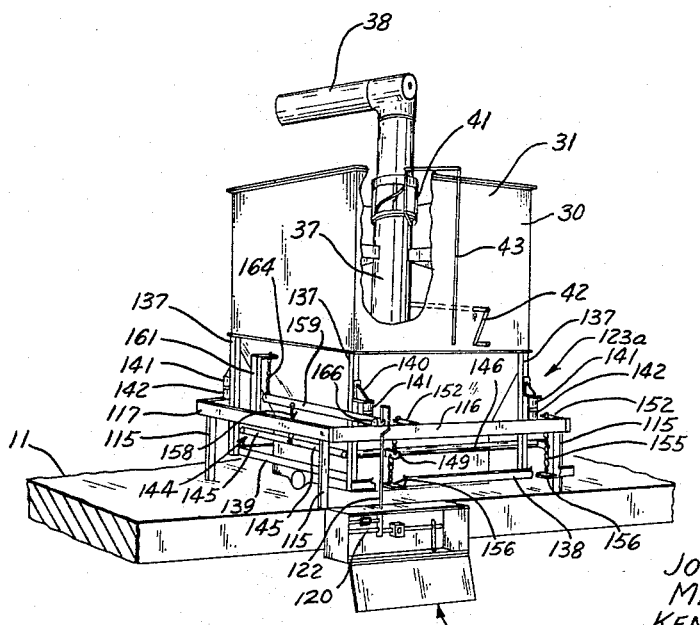
FIG. 7 is an enlarged, fragmentary, perspective view of the weighing apparatus for the mixing unit, certain parts broken away for clarity of illustration.

Referring particularly to FIG. 7, each leg 137 is provided with a bracket 140 affixed to an intermediate portion thereof and extended laterally outwardly therefrom. Each bracket 140 is provided with a vertical post 141, whereas each member 116 of the supporting framework 114 also has an upstanding post 142 adjacent each end thereof which is adapted to nest in contacting engagement with the post 141.

To shift the mixing bin 31 from a position directly supported by the framework 114, wherein the posts 141 and 142 are in abutting relationship, into a weighing relation with the scale mechanism 119, a lever mechanism is provided. This lever mechanism includes a pair of L-shaped lever assemblies 144 (only one clearly showing in FIG. 7). Each assembly 144 comprises a transverse short arm 145 secured to and extended inwardly from the forward end of a longitudinally extended member 146. The respective inner ends of the arms 145 are pivotally connected together, and each of the members 146 is provided with a pair of longitudinally spaced, laterally extended lever arms 149.

Disposed directly above each lever arm 149 is a lever arm 152 extended laterally inwardly from a stationary member 116, and disposed directly below is a lever arm 156 extended laterally inwardly from a movable side member 138. Linkage means are used to interconnect each lever arm 149 with the lever arm 152 above, and separate linkage means are provided to interconnect each lever arm 149 with the lever arm 156 below, so that upward movement of the interconnected ends of the arms 145 will cause the lever arms 149 to fulcrum about a point spaced outwardly thereon from the point of linkage connection with lever arm 156 whereby a vertical raising movement of the lever arms 156, side members 138, and mixing bin 31 will be effected.

The pivotally connected arms 145 are connected by flexible links 158 to an intermediate portion of a horizontally disposed actuating lever 159 which extends transversely to one side of the mixing bin 31 and outwardly over a stationary member 116 for connection by a rod 122 to one end of a conventional balance bar 120 (FIG. 7) as part of the scale mechanism 119. The other end of the actuating lever 159 is positioned adjacent an upright 161 and interconnected thereto by an extensible and retractable unit 164 for selectively effecting vertical translation of the mixing bin 31. To tie down the actuating lever 159, a bracket device 166 of conventional construction is secured to a member 116, and through which the lever 159 extends.

This arrangement permits the feed disposed within the mixing bin 31 to be weighed prior to the addition thereto of any supplement, concentrate or the like, which additional material is inserted into a small tank 32 (FIGS. 1 and 3) disposed to one side of the bin 31. A horizontally disposed auger 33 (FIG. 4) is mounted within the lower portion of the bin 31, and within the tank 32 to mix the supplement with the feed, and at least a pair of additional horizontal augers 34 and 36 are provided within the bin 31 for leveling the mixed feed therein.

To withdraw the feed from the bin 31, after it has been weighed, feed supplement added thereto, and thoroughly mixed, a vertically disposed cylindrical conveyor tube 37 (FIG. 7) is mounted within the mixing bin 31. A lower entrance (not shown) for feed to enter the tube 37 adjacent the bottom of the bin 31 is provideed, whereby the feed is carried upwardly through the tube 37, and through a horizontal auger conveyor tube 38 to an entrance in the top of a storage or feed holding unit 39 (FIGS. 2 and 3).

To effect a mixing of the feed within the bin 31 prior to transmission of the feed to the feed holding unit 39, the conveyor tube 37 (FIG. 7) has an upper telescoping section 41 slideably mounted thereon. When the section 41 is in a raised position, with the lower entrance opened by a lower telescoping member (not shown) by manipulating a handle 42, the feed material is carried upwardly through the tube 37 and laterally through the tube 38. However, by moving a handle 43 (FIGS. 1 and 7) so that a system of connecting links effects a downward movement of the section 41 to expose the upper interior of the tube 37, a vertical, circulatory mixing action within the mixing bin 31 results.

Figure 2:
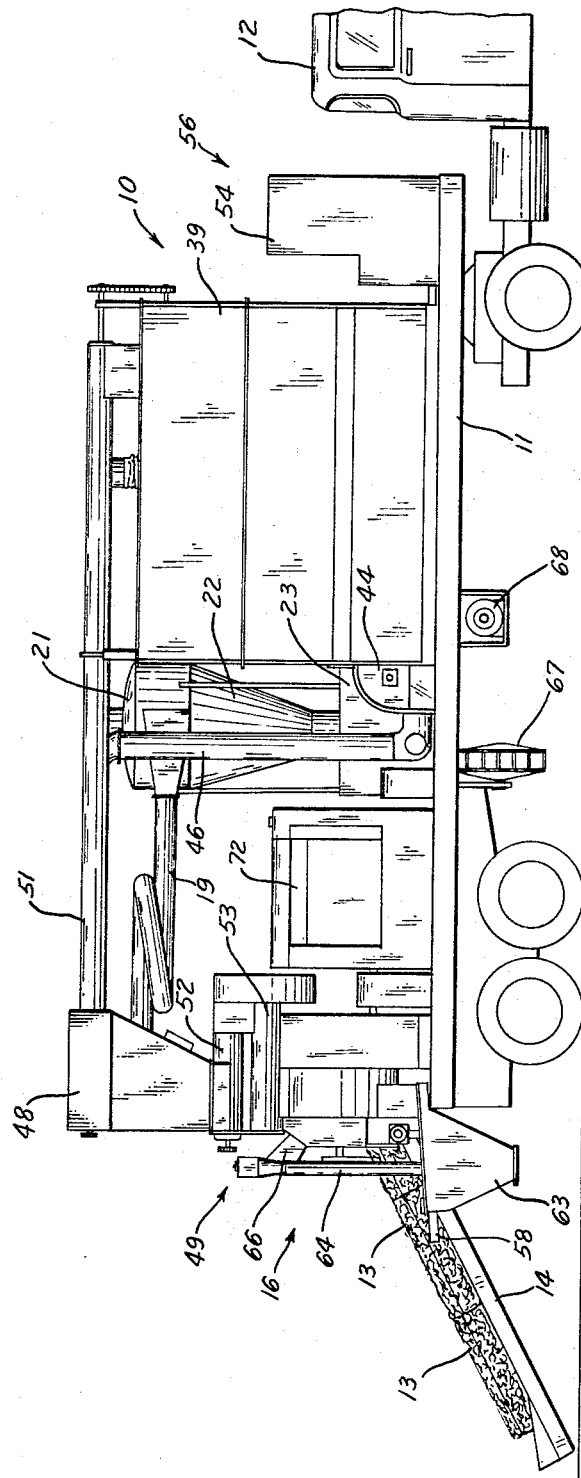
FIG. 2 is an elevational view of the other side of the pellet making machine of this invention.

Referring to the holding unit 39, and particularly to FIGS. 2, 3 and 4, it is seen that an auger 40 is disposed in the bottom of the unit 39 for forcing the feed held therein outwardly through a gate device 44 for subsequent vertical movement by means of an auger conveyor 46 to a horizontal auger conveyor 47. The latter transmits the feed to a hopper 48 mounted on top of a conventional pellet making apparatus, indicated generally at 49. It will be understood that if the manually operable gate device 44 is placed in a closed position, operation of the supply augers 40, 46 and 47 to deliver feed to the hopper 48 is rendered ineffective.

As best seen in FIG. 4, another horizontal auger conveyor 51 is also disposed within the top of the hopper 48 and is operable to return feed from the hopper 48 back to the holding unit 39 when the hopper 48 becomes filled with too great a quantity of feed. An automatic obviation of any overflow tendencies that the hopper 48 might have is thus provided. At the return end of the auger conveyor 51, a horizontally disposed leveling auger 50 is operated, via a pulley system, within the holding unit 39.

Figures 5, 6:
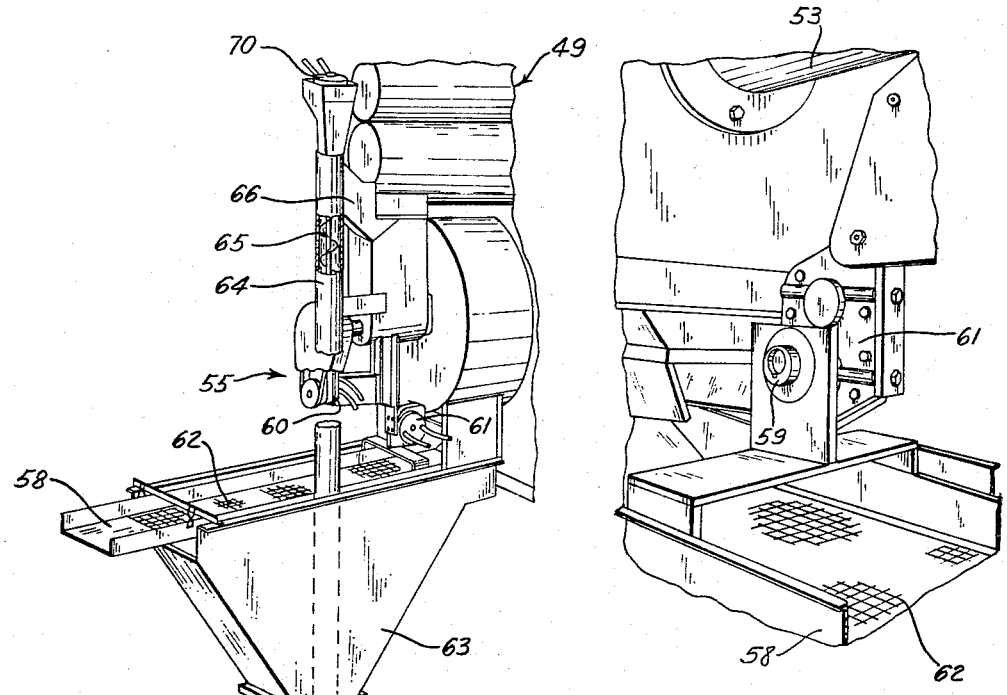
FIG. 5 is an enlarged, fragmentary perspective view of the shaking unit attached to the discharge end of the pellet unit.
FIG. 6 is a further enlarged, fragmentary, perspective view showing the other side of the shaking unit.

Within the hopper 48 the feed is passed through mixing chambers 52 and 53 where it is blended with hot molasses and the like pumped thereto from a storage tank 54 (FIGS. 2 and 3) mounted on the front 56 of the trailer section 11. The homogenous mass is then forced, by an auger 57 (FIG. 4) driven by a pulley unit 55 rotated by a hydraulically actuated motor 60, into the remainder of the pellet making apparatus 49, whereby pellets (not shown) are discharged onto a shaker pan 58 (FIGS. 5 and 6). The shaker pan 58 is reciprocated by an eccentrically mounted cam 59 (FIG. 6), rotated by a hydraulically actuated motor 61 (FIG. 5), and includes a screen 62 through which unsatisfactory pellets, too small for example, are passed for collection in a gatherer 63.

For the purpose of reprocessing the unsatisfactory pellets, a vertical auger conveyor tube 64 is extended into the bottom of the gatherer 63 and is disposed in an upright manner for depositing the unsatisfactory pellets through a chute 66 back into the pellet making apparatus 49 for reprocessing. The auger 65 is driven by a hydraulically actuated motor 70 mounted on the top of the tube 64.

All finally process and satisfactory pellets are shaken longitudinally of the screen 62 and are dumped off the end thereof into any container.

Referring to FIG. 8, hydraulic fluid for powering the shaker system is supplied from a reservoir 95 through a conduit 96 to a pump 97 operated off of either one of a diesel motor hereinafter described. The pump 97 transmits the fluid through a line 98 to a control valve 99, conveniently located for the operator, and a by-pass line 100 back to the reservoir 95 is supplied. From the control valve 99, a conduit 101 leads to the shaker unit motor 61, another conduit 102 leads from the motor 61 to the vertical auger motor 70, another conduit 103 leads from the motor 70 to the force feed motor 60, and a return conduit 104 leads back to the reservoir.

To cool the pellets, which are at approximately 180 degrees Fahrenheit when discharged, a blower 67 (FIG. 2) is utilized as a source of cooling air to be blown over and onto the pellets. A pump 68 for the molasses is also shown in FIG. 2, this pump being utilized to pump the molasses from the tank 54 to the pellet making apparatus 49.

To power the operating elements of the feed processing machine, a pair of diesel motors 71 and 72 (FIGS. 3 and 4) are provided. The motor 71 rotates a drive shaft 73 for operating the hammer mill 17, and a pulley belt 74 and a pair of sheaves 76 and 77 take power from the shaft 73. After going through a ratio reducer 78, a shaft 79 is connected with a telescopic drive unit 81 for transmitting the power to a gear box 82 at the lower end of the mixing bin vertical auger 37.

To selectively operate the collector auger 27 for moving feed to the mixing bin 31, a pulley unit 83 takes off power from the shaft 79 and transmits it through an operator actuated clutch 84. To drive the leveling augers in the mixing bin 31, another pulley unit 86 takes off power and rotates the lower auger 33. A third pulley unit 87 takes power off the auger 33 and rotates the leveling augers 34 and 36.

The motor 72 (FIG. 4) rotates a drive shaft 88 which is used as a basis for operating the pellet making apparatus 49. A pulley unit 89 takes power off the shaft 88 for supplying power to the blower 67 and, through a gear ratio box 90 and a pulley unit 91, to the holding unit auger 40. This auger 40 in turn rotates the upright auger 46, it being clearly illustrated in FIG. 4 that a pulley unit 92 transmits power from the auger 47 to the auger 51, and another pulley unit 93 transmitting to the leveler auger 50.

It should be noted that although the power for the portable feed processing machine 10 is supplied by diesel motors 71 and 72, for stationary operation one or more electric motors could be substituted therefor. In this instance, a generator would be substituted for the fluid pump 97 (FIG. 8), and a trio of electric motors would be substituted for the hydraulic motors 61, 70, and 60 of the pellet shaker system.

In complete operation, the process of the machine 10 is as follows, the machine 10 having been driven to the most convenient place for all concerned. Baled hay is fed to a hammer mill 17 with or without the addition of grain. The feed is finely ground and blown to a collection station 23 during which time the dust is removed. The feed is then adjustably fed to a mixing bin, where it is mixed with or without supplement material or the like, and wherein it is weighed prior to said mixing to determine appropriate ratios.

The mixed hay is then continuously conveyed to the hopper of a pellet making apparatus, the conveyance controlled by a manually adjusted gate, and remaining thereafter uncontrolled due to the automatic feedback of any overflow of the hopper. The hay is forced into the pellet making apparatus, the discharged pellets screened according to size, and the undersized-commonly called "fines"—pellets returned to the pellet making apparatus for reprocessing prior to final discharge as satisfactory pellets. The process may be completed by cooling the discharged heated pellets.

Some changes may be made in the construction and arrangement of our apparatus for producing pellets for livestock feed without departing from the real spirit and purpose of our invention, and it is our intention to cover by our claims, any modified forms of structure or use of mechanical equivalents which may be reasonably included within their scope.

We claim:
1. A feed processing machine comprising in combination:
   a frame;
   a hammer mill mounted on said frame and adapted to receive feed to be processed;
   means mounted on said frame for receiving supplement and for mixing said supplement and said feed together;
   means for transmitting the feed from said hammer mill to said mixing means;
   means mounted on said frame for making pellets from said mixed feed; and
   auger means for transmitting the mixed feed from said mixing means to said pellet making means, said auger means including means for returning mixed feed from said pellet making means to said mixing means when the feed in said pellet making means reaches a predetermined quantity.

2. A feed processing machine as defined in claim 1, and further wherein said pellet making means includes a hopper unit for directly receiving the feed transmitted from said mixing means, and includes means for forcing the feed from said hopper unit into the remainder of said pellet making means.

3. A feed processing machine as defined in claim 1, and further wherein a dust removing chamber is interposed between said hammer mill and said mixing means for removing dust from the feed as it is transmitted therebetween.

4. A feed processing machine as defined in claim 1, and further wherein a means is mounted on said frame in operative engagement with said mixing means for weighing said feed therein.

5. A feed processing machine comprising in combination:
   a frame;
   a hammer mill mounted on said frame and adapted to receive feed to be processed;
   means mounted on said frame for receiving supplement and for mixing said supplement and said feed together;
   means for transmitting the feed from said hammer mill to said mixing means;
   means mounted on said frame for making pellets from said mixed feed; and
   auger means for transmitting the mixed feed from said mixing means to said pellet making means;
   said auger means including a supply auger conveyor for transmitting the feed to the pellet making means and a return auger conveyor for returning feed to said mixing means when feed in said pellet making means reaches a predetermined quantity.

6. A feed processing machine comprising in combination:
   a portable frame;
   a hammer mill mounted on said frame;
   means mounted on said frame for conveying feed to be processed into said hammer mill;
   a feed collection unit mounted on said frame;
   means for transmitting feed from said hammer mill to said collection unit;
   a feed mixing unit mounted on said frame;
   means for transmitting feed from said collection unit to said mixing unit;
   means for adding supplement to said feed mounted on said frame in operative connection to said mixing unit;
   means mounted on said frame in operative connection with said mixing unit for weighing the feed within said mixing unit;
   an auger conveyor mounted on said frame;
   adjustable means mounted within said mixing unit for withdrawing said feed from said mixing unit and transmitting it to said auger conveyor, said adjustable means operable to divert said withdrawn feed back into said mixing unit;
   a feed holding unit mounted on said frame at the discharge end of said auger conveyor;
   a hopper unit for receiving feed;
   first conveyor means for transmitting feed from said holding unit to said hopper unit;
   means for rendering said first conveyor means ineffective;
   second conveyor means for returning feed from said hopper unit to said holding unit upon the feed in said hopper unit reaching a predetermined quantity;
   a unit for making pellets of said feed;
   means for transmitting molasses to said pellet making unit;
   means for forcing feed from said hopper unit to said pellet making unit;
   means for discharging pellets from said pellet making unit, said discharging means capable of sorting unsatisfactory pellets from satisfactory ones;
   means for returning said unsatisfactory pellets to said pellet making unit;

means for cooling said discharged pellets; and means mounted on said frame for supplying power to the operating elements of said machine.

7. A feed processing machine comprising in combination:
- a frame;
- a hammer mill mounted on said frame and adapted to receive feed to be processed;
- means mounted on said frame for receiving supplement and for mixing said supplement and said feed together;
- means for transmitting the feed from said hammer mill to said mixing means;
- means mounted on said frame for holding the mixed feed;
- means for transmitting the mixed feed from said mixing means to said holding means;
- means mounted on said frame for making pellets from said mixed feed;
- first conveyor means for transmitting the mixed feed from said holding means to said pellet making means; and
- second conveyor means for returning mixed feed from said pellet making means to said holding means when the mixed feed in said pellet making means reaches a predetermined quantity.

8. A feed processing machine as defined in claim 7, and further wherein said frame is portable.

9. A feed processing machine as defined in claim 8, and further wherein a unit is mounted on said frame for collecting the feed after having passed through the hammer mill.

10. A feed processing machine as defined in claim 9, and further wherein a means is mounted on said frame in operative engagement with said mixing means for weighing the feed therein.

11. A feed processing machine as defined in claim 10, and further wherein pellet making means includes a hopper unit for receiving feed directly from said first conveyor means, and including further means for forcing the feed from said hopper unit into the remainder of said pellet making means.

12. A feed processing machine as defined in claim 11, and further wherein said pellet making means includes a discharge unit for discharging the pellets from the pellet making means, said discharge unit capable of screening said pellets according to size and returning unsatisfactory ones directly to said pellet making means.

13. A feed processing machine comprising in combination:
- a portable frame;
- a hammer mill mounted on said frame and adapted to receive feed to be processed;
- a feed collection unit mounted on said frame;
- means for transmitting feed from said hammer mill to said collection unit while simultaneously removing dust therefrom;
- a feed mixing unit mounted on said frame;
- means for transmitting feed from said collection unit to said mixing unit;
- means mounted on said frame for weighing the feed in said mixing unit;
- means for adding supplement to said feed connected to said mixing unit;
- a hopper unit mounted on said frame for receiving feed;
- conveyor means for selectively transmitting feed from said mixing unit to said hopper unit and for transmitting feed from the lower part of said mixing unit to the upper part thereof; and
- a unit for receiving feed from said hopper unit, mounted on said frame, and operable to make pellets from said feed.

References Cited by the Examiner
UNITED STATES PATENTS

| | | | |
|---|---|---|---|
| 1,585,931 | 5/1926 | Mabee | 99—235 |
| 1,825,475 | 9/1931 | Pfeiffer | 99—235 |
| 2,223,904 | 12/1940 | Zentz et al. | 99—8 |
| 2,536,387 | 1/1951 | Mulvany | 99—8 |
| 2,651,269 | 9/1953 | French | 107—4 |
| 2,762,288 | 9/1956 | Guerrero | 99—235 |
| 2,772,642 | 12/1956 | Lindl | 107—4 |
| 3,181,482 | 5/1965 | Heth et al. | 107—4 |

WALTER A. SCHEEL, *Primary Examiner.*

BILLY J. WILHITE, *Examiner.*